United States Patent [19]
Harada et al.

[11] Patent Number: 5,653,126
[45] Date of Patent: Aug. 5, 1997

[54] PACKING MATERIAL AND AIR SEPARATOR

[75] Inventors: Susumu Harada, Kudamatsu; Satihiro Yoshimatsu, Kumage-gun; Kazuo Someya; Naruyasu Okamoto, both of Kudamatsu, all of Japan

[73] Assignee: Hitachi, Ltd., Tokyo, Japan

[21] Appl. No.: 523,522

[22] Filed: Sep. 1, 1995

[30] Foreign Application Priority Data

Sep. 19, 1994 [JP] Japan .................................. 6-222973

[51] Int. Cl.⁶ .................................. B01J 19/32; B01D 3/16; F25J 3/04
[52] U.S. Cl. .................................. 62/643; 62/906; 202/158
[58] Field of Search .................................. 62/905, 906, 643; 202/158; 261/103, 110, 112.1, 114.2–114.3

[56] References Cited

U.S. PATENT DOCUMENTS

| | | | |
|---|---|---|---|
| 3,785,620 | 1/1974 | Huber | 261/103 |
| 4,501,707 | 2/1985 | Bühlmann | 202/158 X |
| 4,597,916 | 7/1986 | Chen | 202/158 X |
| 5,091,119 | 2/1992 | Biddulph et al. | 261/114.3 |
| 5,100,448 | 3/1992 | Lockett et al. | 62/906 X |
| 5,237,823 | 8/1993 | Cheung et al. | 62/906 X |
| 5,267,444 | 12/1993 | Lehman et al. | 62/905 X |
| 5,525,271 | 6/1996 | Potthoff et al. | 261/110 |

FOREIGN PATENT DOCUMENTS

| | | |
|---|---|---|
| 2251355 | 11/1974 | France . |
| 42 09 132 A 1 | 9/1993 | Germany .................. 62/906 |
| 15-28452 | 12/1940 | Japan . |
| 54-16761 | 2/1979 | Japan . |
| 1-244269 | 9/1989 | Japan . |
| 1-312382 | 12/1989 | Japan . |
| 4-227461 | 8/1992 | Japan . |
| 4-254198 | 9/1992 | Japan . |
| 5-103977 | 4/1993 | Japan . |
| 5-184854 | 7/1993 | Japan . |

*Primary Examiner*—Christopher Kilner
*Attorney, Agent, or Firm*—Antonelli, Terry, Stout & Kraus, LLP

[57] ABSTRACT

A packing material capable of improving the uniformity of liquid distribution and of achieving a preferable gas-liquid contact reaction, even in the case where the specific surface area of the packing material is small, includes a plurality of projections provided on the surface of a thin plate, and a plurality of holes provided respectively between the projections. In one embodiment, the transfer extension of each projection is larger than a longitudinal extension thereof, so that descending liquid flows downward while being transversely dispersed by the projection. The holes are provided between the projections so that they do not obstruct the transfer dispersion of liquid at the projection. Moreover, the holes accelerate the transverse dispersion of liquid, or the dispersion of liquid between front and rear surfaces of the thin plate, by the surface tension of the liquid. As a result, excellent uniformity of liquid distribution can be obtained on the surface of the thin plate. An improved air separator containing the packing material incorporated into a rectifier for performing gas-liquid contact reaction is also disclosed.

25 Claims, 4 Drawing Sheets

PACKING MATERIAL AND AIR SEPARATOR

BACKGROUND OF THE INVENTION

The present invention relates to a gas-liquid contact reaction apparatus, and particularly to the construction of a structured packing material for maintaining a desirable state of gas-liquid contact in an air separator and the construction of an air separator to which the packing material of the present invention is applied.

The constructions of prior art structured packing materials for gas-liquid contact are described in Japanese Published Patent No. SHO 40-28452, and Japanese Laid-open Patent Nos. SHO 54-16761 and HEI 5-103977. According to these prior art reference, the packing material is composed of thin plates each being formed of a wire-mesh having a plurality of holes or formed of a sheet-like metal, and the thin plate has waveform passages for liquid and gas. More specifically, the waveform passages are tilted relative to a column axis and the adjacent passages cross each other for accelerating the dispersion and mixture of liquid and gas in the radial direction. The wire-mesh as the thin plate is advantageous in terms of performance because it is self-lubricating and thus capable of enhancing the uniformity of liquid distribution, but it is inferior to the packing material made of the sheet-like metal in terms of cost. In this regard, the packing material made of the sheet-like metal is provided with horizontal micro-grooves on the surface for transversely dispersing liquid relative to a column axis and for increasing a gas-liquid contact area, or it is disposed with a plurality of projections on the surface in a staggered manner for increasing the dispersing effect of the flow of liquid and gas.

On the surface of an actual packing material, a plurality of holes are provided irrespective of the arrangement of micro-grooves and projections for dispersing liquid between the front and rear surfaces of a thin plate constituting the packing material.

The examples of air separators using the above-described structured packing materials have been disclosed in Japanese Laid-open Patent Nos. HEI 1-244269, HEI 1-312382 and HEI 4-227461.

The above-described prior art packing materials, however, have been insufficient with respect to the structure for improving the uniformity of liquid distribution on the surface of a thin plate. This is because the prior art only has addressed the arrangement of the micro-grooves or projections for improving the liquid distribution, they have not addressed problems regarding the positional relationship between a plurality of the projections and holes provided on surface of the thin plate. In the prior art material, the holes having a diameter not strictly determined are provided at positions not strictly determined relative to the projections and micro-grooves. Consequently, the configurations of the projections and micro-grooves have been actually deformed upon perforation of the holes, or the projections have been partially or wholly broken.

SUMMARY OF THE INVENTION

In view of the foregoing, a first object of the present invention is to provide a packing material having an improved uniformity of liquid distribution compared with the prior art, to thereby achieve a preferable gas-liquid contact even in the case where the specific surface area of the packing material is small.

A second object of the present invention is to improve the performance of an air separator by providing the packing material of the present invention with a rectifier for performing gas-liquid contact.

The above-described first object can be achieved by providing a plurality of projections on the surface of a thin plate constituting a packing material, and by providing a plurality of holes between the projections in the state that the thin plate is developed (e.g., prior to corrugation of the thin plate), and further by positioning the holes to be intermediate between the rows of the projections. Preferably, the projections are provided in parallel; the transverse extension of each of the projections relative to a column axis is larger (three times or more) than the longitudinal extension thereof; and the whole projected area of the projections is 20% or more of the surface area of the thin plate which is in the developed state. More preferably, the height of the projection is in the range of from 0.2 mm to 0.5 mm; the diameter of the hole is in the range of from 2.5 mm to 5.0 mm; the specific surface area of the packing material is in the range of from 800 $m^2/m^3$ to 1100 $m^2/m^3$; and the tilting angle of waveform passages tilted relative to a column axis is in the range of from 45° to 50°.

The second object can be achieved by providing the packing material of the present invention, which is excellent in rectifying efficiency, to each of the lower and upper columns of a dual rectifier and an argon column of an air separator.

The packing material is composed of thin plates each having a plurality of holes and waveform passages tilted relative to a column axis. The passages of the adjacent thin plates being disposed to cross to each other, and upward-flow of gas is contacted with downward-flow of liquid. In this packing material, a plurality of projections are provided on the surface of the above thin plate and holes are provided between the projections. Since the transverse extension of each projection relative to a column axis is larger than the longitudinal extension thereof, liquid flowing downward in the direction of the column axis flows downward while being transversely dispersed at the projections. The liquid distribution is thus performed at a plurality of the projections provided on the thin plate. The holes are provided at the positions not interfering with the projections, that is, between the provisions, so that they do not obstruct the transverse dispersion of liquid at the projections. Moreover, the holes themselves accelerate the transverse dispersion of liquid, or the dispersion of liquid between the front and rear surfaces of the thin plate by the liquid distribution. In prior art packing materials, the positional relationship between the projections and the holes has been not specified, thereby often causing inconvenience in that the positions of the holes are overlapped onto those of the projections, or the projections are partially broken. The irregularity of the positional relationship of the projections and holes of the prior art has harmed the dispersion of liquid, at least by accelerating the drift in the packing material, thus reducing the efficiency in the gas-liquid contact. On the contrary, in the packing material of the present invention, the above-described inconvenience of the prior art packing material can be solved, and a preferable liquid distribution can be obtained on the surface of the thin plate. Accordingly, a gas-liquid contact interface is increased, which leads to effective gas-liquid contact reaction.

An air separator includes a dual rectifier of a high pressure column and a low pressure column, and an argon column, and it rectifies and separates raw air into nitrogen, oxygen and argon using the difference in boiling point therebetween. It is known that, by replacing prior art trays conventionally used for a rectifier with structure packing materials being small in a pressure loss per theoretical plate, the pressure loss in the rectifier can be reduced. According to the present invention, by providing a packing material with a high efficiency to a rectifier, it becomes possible to more effectively perform gas-liquid contact reaction, and hence to increase the performance of an air separator while reducing the size thereof.

DESCRIPTION OF THE PREFERRED EMBODIMENTS

Figure 1:
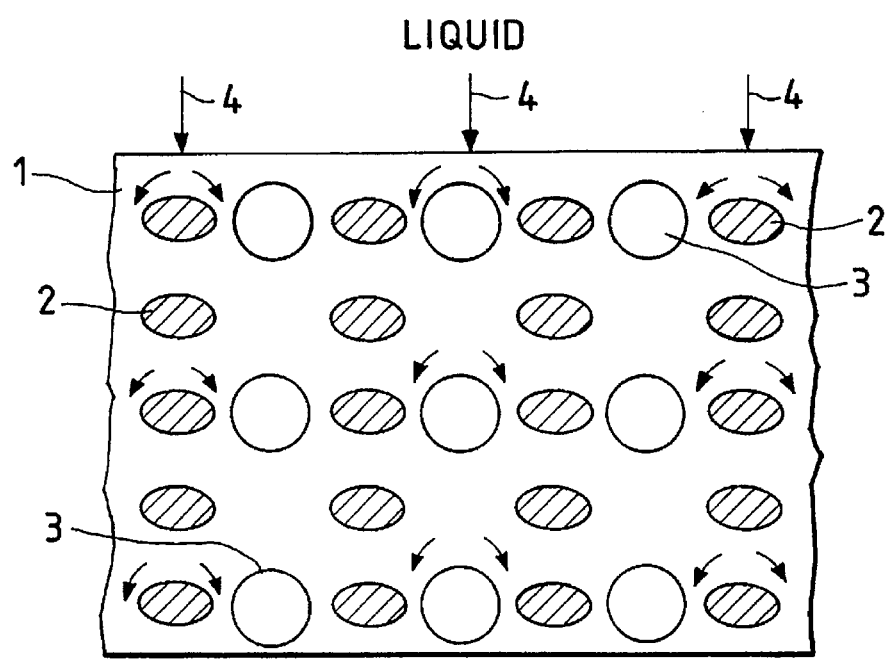
FIG. 1 is a partial development view showing an example of a thin plate of a packing material of the present invention.

FIG. 1 shows one embodiment of the present invention. In this figure, a thin plate as a basic component of a packing material of the present invention is not folded in a waveform, that is, it is developed. The thin plate 1 is made of metal, plastic, ceramic or the like. In this embodiment, it is made of a sheet-like metal material with a thin thickness. A plurality of projections 2, each having an approximately elliptical shape, shown by the slanting lines, are provided on the surface of the thin plate 1, for example by pressing or embossing. In this case, on the opposed surface of the thin plate 1, recesses are formed on the positions corresponding to the projections. Liquid 4 flows downward in the direction of a column axis, and at the projections 2, part of the liquid is transversely dispersed and the remaining part flows downward beyond the projections 2. The dispersion of liquid is thus performed at a plurality of projections 2 provided on the thin plate 1. Holes 3 are provided at positions not interfering with the projections 2, that is, between the projections 2. Accordingly, the holes 3 do not obstruct the transverse dispersion of liquid at the projections 2, but rather accelerate the transverse dispersion of liquid and the diversion of liquid from the front surface to the rear surface of the thin plate 1 due to the surface tension of the liquid.

In the packing material of the present invention, an excellent liquid distribution can be thus obtained on the surface of the thin plate. As a result, a gas-liquid contact interface is increased, which leads to effective gas-liquid contact reaction, that is, effective rectification. In this embodiment, the projections are arranged in parallel for convenience; however, the rows of the projections are allowable to be somewhat shifted. Each hole is not necessarily positioned at the center between the associated projections. The configuration of the projection is not limited to an approximately elliptic shape.

Figure 2:
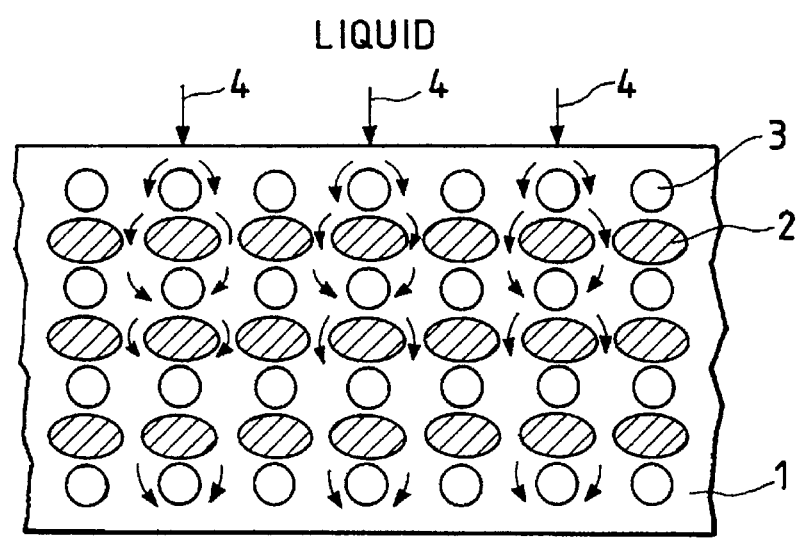
FIG. 2 is a partial development views showing another example of a thin plate of a packing material of the present invention.

FIG. 2 shows another embodiment. In this figure, holes 3 and projections 2 are provided on a thin plate 1 alternately in the direction of a column axis. At the holes 3, liquid 4 flowing downward in the direction of the column axis is transversely dispersed and diverted from the front surface to the rear surface of the thin plate 1 due to the surface tension of the liquid, and thereafter at the projections 2, the liquid 4 flows downward while being transversely diverted. In this embodiment, the transverse extension of liquid is changed relative to the downward flow of the liquid. Thus, the downward flow of the liquid becomes complicated, which enables a gas-liquid contact interface to be increased. To certainly produce this complicated flow, the nominal dimensions of the hole 3 and the projection 2 are required to be changed such that the transverse extension of the hole 3 relative to the column axis is smaller or larger than the transverse extension of the projection 2 relative to the column axis.

According to the present invention, therefore, it becomes possible to obtain an excellent uniformity of liquid distribution on the surface of a thin plate, and hence to achieve effective gas-liquid contact reaction.

Figure 3:
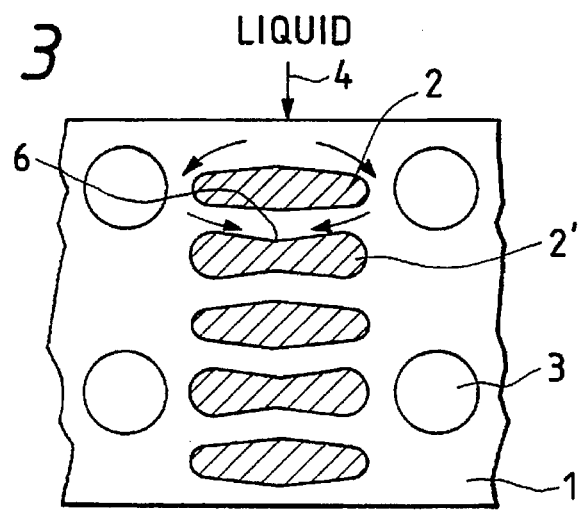
FIG. 3 is a partial development view showing a further example of a thin plate of a packing material of the present invention.

FIG. 3 is a schematic view of a further embodiment showing part of a thin plate 1. A plurality of projections 2 and a plurality of projections 2' different in shape from the projections 2 are provided on the surface of the thin plate 1 alternately in the direction of a column axis, and holes 3 are positioned between the rows of the projections 2 and 2'. The flow of liquid is basically the same as described in FIG. 1, except that part of liquid 4 flowing downward in the direction of the column axis is transversely dispersed at the projections 2, and the remaining one flows downward beyond the projections 2. On the other hand, since recesses 6 for allowing liquid to be stayed are provided at the projection 2', the liquid flowed over the projections 2 is collected in the recesses 6 of the projection 2'. After that, the liquid flows toward the projections 2, whereupon it is also repeatedly diverted. Meanwhile, since the holes 3 are provided at the positions not interfering with the projections 2 and 2' like the previous embodiment, the liquid is diverted due to the surface tension of liquid as described above, differently from the diversion of liquid at the projections 2 and 2'.

According to the present invention, therefore, the flow rate of the liquid flowing downward along the rows of the projections is changed by the function of the projections 2 for diverting liquid and the function of the projections 2' for allowing liquid to be stayed, and thereby the flow rate of liquid exhibits a complicated form. This increases a gas-liquid contact time, resulting in the increased gas-liquid contact interface. Consequently, an excellent liquid distribution can be obtained on the surface of the thin plate, which leads to effective gas-liquid contact reaction, that is, effective rectification.

Figure 4:
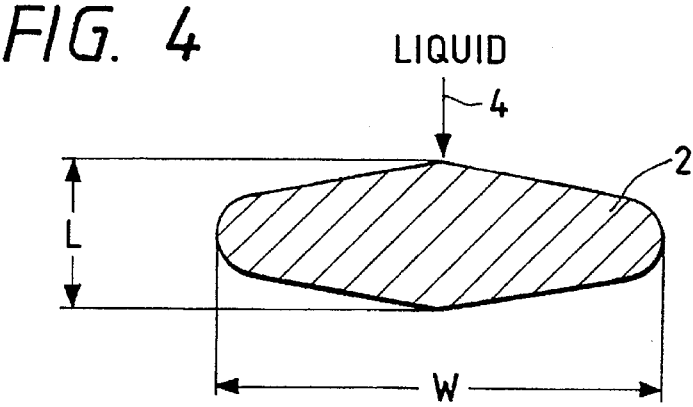
FIG. 4 is a front view showing geometric dimensions of a projection.

FIG. 4 shows one embodiment of the configuration of a projection provided on a thin plate. The projection 2 is basically extended transversely relative to the descending direction of liquid 4. To effectively disperse liquid in the transverse direction, the transverse extension W of the projection 2 is required to be larger than the longitudinal extension L of the projection 2, and it is desirable for the transverse extension W to be at least three times the longitudinal extension L. To increase a gas-liquid contact area, the number of projections is advantageously made as large as possible. To ensure a preferable rectifying efficiency of the packing material, the total projected area of the projections is required to be at least 20% of the surface area of the thin plate which is developed. In this embodiment, the projection is formed in the approximately elliptic shape; however, it may be formed in other shapes such as rectangular, triangular and rhombic shapes as long as it satisfies the geometric dimensions specified in the present invention.

Figure 5:
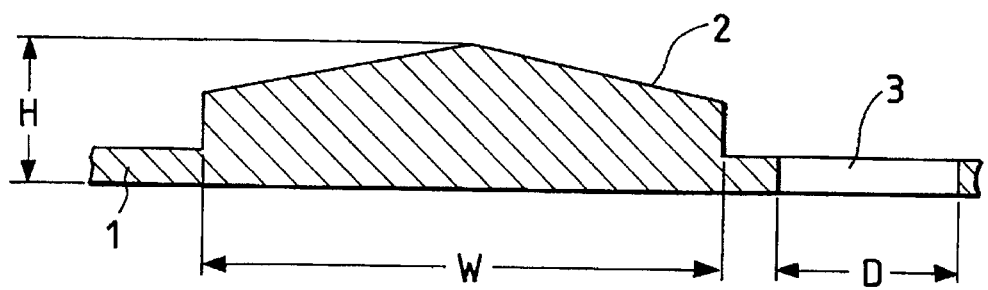
FIG. 5 is a convenient sectional view showing the geometric dimensions of a projection.

FIG. 5 is a convenient sectional view of the projection shown in FIG. 4. A projection 2 is provided on a thin plate 1 such that in this embodiment the central portion is highest. However, the projection may be formed to be even in the height direction. A packing material used for an air separator is required to separate raw air into high purity oxygen and high purity nitrogen, and usually it is of a high theoretical plate type with a specific surface area of 500 m$^2$/m$^3$ or more. On the other hand, for the same flow rate, the film thickness of liquid flowing downward becomes thinner as the specific surface area becomes larger. The average film thickness of the packing material provided in a rectifier used for an air separator is about 1 mm. As a result of experiments, to effectively disperse liquid on a thin plate of the packing material, the height H of the projection is required to be in the range of from 0.2 mm to 0.5 min. This is because, when the height H of the projection is excessively larger, liquid flows along only the flat portions of the projections thereby reducing an effective gas-liquid contact area; meanwhile, when the height H of the projection is excessively smaller, the disturbing and dispersing effect of liquid is harmed. The diameter of the hole 3 should be also suitably determined. In the case where the quantity of liquid is small, when the diameter D of the hole is larger, there is a tendency for liquid not to be dispersed transversely along the holes due to the surface tension but is dispersed between the front and rear surfaces of the thin plate 1 by way of the holes. This substantially reduces the transverse dispersing effect of liquid relative to the column axis in the holes. Accordingly, in the case where the quantity of liquid is small, the diameter D of the hole is preferably set to be small for increasing the rectifying effect. The experiments showed that the allowable diameter D of the hole is in the range of from 2.5 mm to 5.0 mm.

Figure 6:
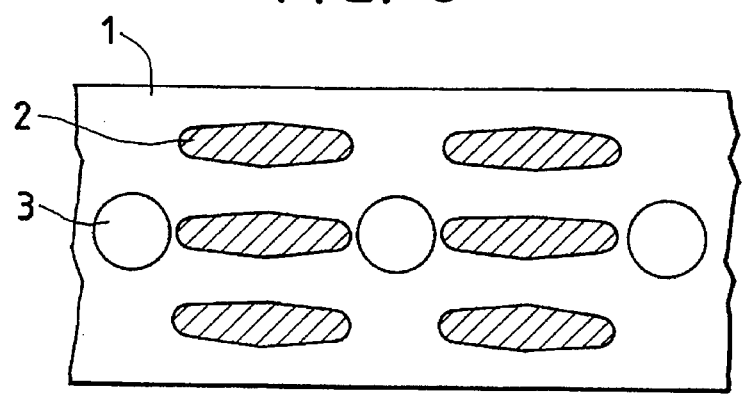
FIG. 6 is a partial development view showing a further example of a thin plate of a packing material of the present invention.

FIG. 6 shows a further embodiment of the present invention. In this figure, a thin plate as the basic element of a packing material of the present invention is not folded in a waveform, that is, it is developed. The thin plate is made of a sheet-like metal with a thin thickness. A plurality of projections 2, each having an approximately elliptic shape shown by the slanting line, are provided in parallel on the surface of the thin plate 1 by, for example, pressing or embossing. The transverse extension of the projection 2 is about 4 mm, which is four times the longitudinal extension of the projection 2. The height of the central portion of the projection is 0.5 mm. Each hole 3 is provided between the projections 2, and in this embodiment, the hole 3 is provided at the center between the rows of the projections 2. The diameter of the hole 3 is about 2.5 mm. The whole projected area of the projections is about 25% of the surface area of the thin plate which is developed.

Various effects described above can be thus achieved in this embodiment. Specifically, there can be formed an effective liquid distribution by the effective selection of the height of the projection, the diameter of the hole, and the transverse extension of the projection. In the packing material of the present invention, an excellent uniformity of liquid distribution can be obtained on the surface of the thin plate. The packing material is thus high in theoretical plate which is suitable for a rectifier particularly used for an air separator, and it can exhibit a high performance in the operation in which the quantity of liquid is small. In addition, as the arrangement of the projections, the positional shift of the rows caused upon manufacture is somewhat allowable. The hole is not necessarily positioned at the center between the rows of the projections, that is, the positional shift thereof caused upon manufacture is somewhat allowable. The configuration of the projection is also not limited to an approximately elliptic shape.

Figure 7:
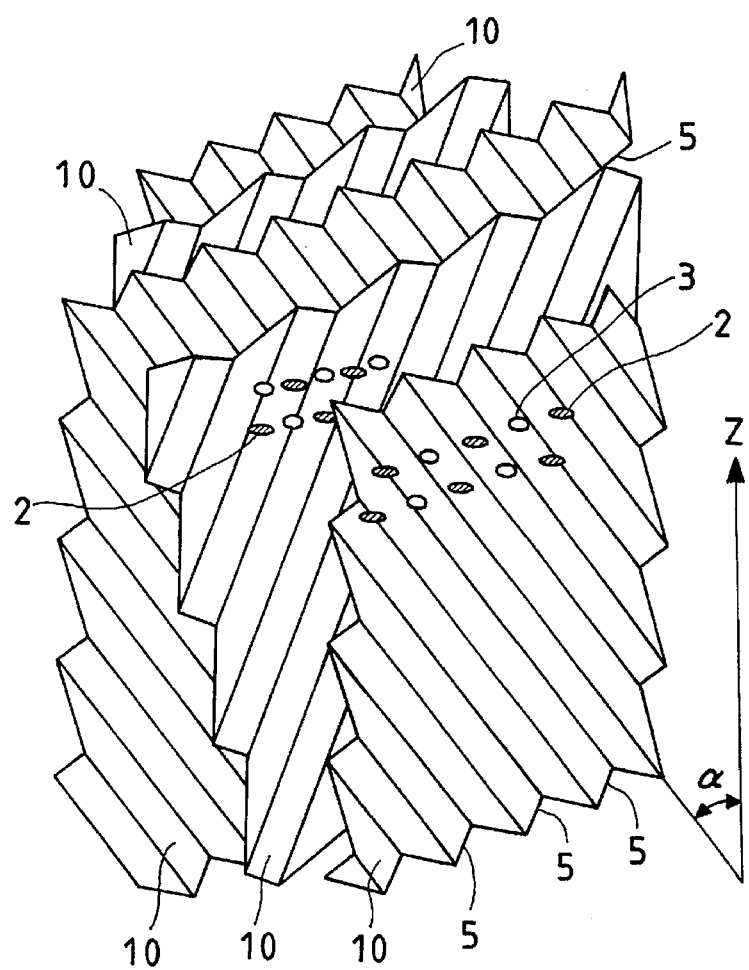
FIG. 7 is a perspective view showing one embodiment of a packing material of the present invention.

FIG. 7 shows one embodiment of the folded form of thin plates of the present invention, wherein for example five of aluminum plates 10 are folded. The aluminum plate 10 has a plurality of waveform passages 5 folded in such a manner as to be tilted by $\alpha°$ relative to a column axis for allowing downward flow of liquid and upward flow of gas therethrough, a plurality of holes 3 having suitable opening ratio which are provided at positions not interfering with the projections, and projections 2 (only partly shown in the figure) provided over the whole surface. The aluminum plates 10 are disposed such that the flow passages are alternately crossed to each other. A specified number of such aluminum plates 10 are superimposed to each other, thus constituting one element of the packing material.

Figure 8:
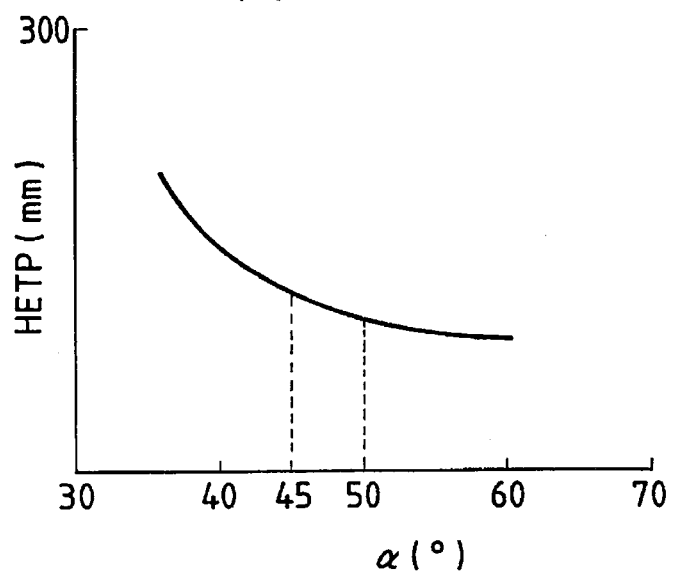
FIG. 8 is a characteristic diaphragm showing experimental values of HETP.

FIG. 8 shows the dependence of HETP of a packing material of this embodiment on an angle ($\alpha°$) of waveform passages relative to a column axis Z in the case that a specific surface area (surface area per unit volume) of the packing material is in the range of from 800 m$^2$/m$^3$ to 1100 m$^2$/m$^3$. The HETP in the ordinate is the abbreviation for "Height Equivalent to a Theoretical Plate", which typically shows the rectifying efficiency of the packing material. Experiments were carried out in a nitrogen-oxygen system for rectifying liquid air using a packing material having a diameter of about 100 mm and including three stages of the elements shown in FIG. 7. The performance of the packing material was measured under the condition of total reflux, that is, under the condition that the quantity of descending liquid is the same as that of ascending gas. At this time, an F-factor was 1 (under the operational condition in the air separator, it being usually about 1). The F-factor is the product of a superficial velocity of ascending gas and the square root of a gas density, and is the important parameter for evaluating the performance of the packing material. For the angle α being in the range of from 45° to 50°, the HETP of the packing material in this embodiment is gently reduced; and for the angle α being 50° or more, the HETP is little changed. Moreover, it was confirmed that a pressure loss per a theoretical plate is abruptly increased when the angle α is 50° or more. Any packing column is desirable to be provided with a packing material, which is small in HETP, that is, small in the height thereof for performing a unit rectification, and which is small in pressure loss. Accordingly, it is important to set the angle α of the waveform passages of the packing material relative to a column axis to be in the range of from 45° to 50°.

As described above, according to this embodiment, the dispersion effect of liquid in the packing material can be enhanced, and the rectifying efficiency be increased. Moreover, a packing column of an air separator using this packing material can be reduced in size.

As the material of the thin plate constituting the above-described packing material used for an air separator, aluminum being free of cold brittleness, lightweight and easy of machining, is preferable. During the manufacturing process of the packing material, it was confirmed that the material obtained by work-hardening of an aluminum alloy excellent in strength and formability is more preferable.

Figure 9:
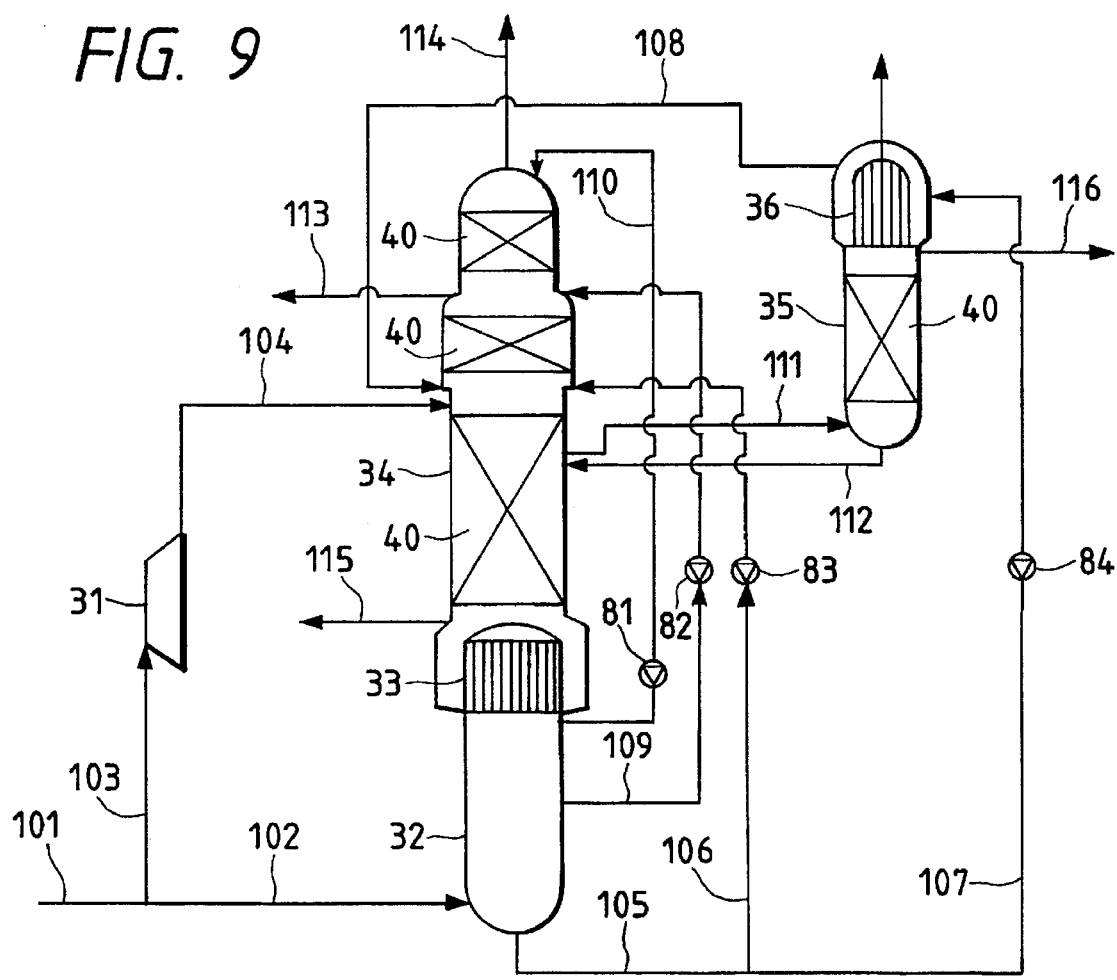
FIG. 9 is a flow chart showing one embodiment of an air separator of the present invention.

FIG. 9 shows an embodiment in which a packing material of the present invention is used in an air separator. The air separator includes a dual rectifier composed of a high pressure column 32 and a low pressure column 34, a crude argon column 35 for separating argon, and an expansion turbine 31. A main condenser 33 is provided between overheads of the low pressure column 34 and the high pressure column 32. A gas-liquid contact reaction means for rectification is contained in each of the high pressure column 32, low pressure column 34 and crude argon column 35. In this embodiment, prior art trays are provided in the high pressure column 32, and the packing material 40 having the rectifying characteristic shown in FIG. 8 is provided in each of the low pressure column 34 and the crude argon column 35.

The principle of the function of the air separator will be described. Raw air is compressed in a compressor and is cooled to 100° K. by a heat exchanger. Part of the raw air is then introduced in the expansion turbine 31 by way of conduits 101 and 103, whereupon it is subjected to adiabatic expansion to be cooled and is supplied for cooling to an intermediate portion of the low pressure column 34 through a conduit 104. On the other hand, the remaining raw air is supplied to the bottom of the high pressure column 32 by way of a conduit 102 and flows upward in the column. It is condensed in the main condenser 33 at the overhead of the high pressure column 32, which flows downward as reflux liquid and is contacted with ascending gas on the tray to be rectified. As a result, in the high pressure column 32, the liquid of high purity nitrogen gas and the gas are obtained in the overhead, and liquid air is obtained in the bottom.

The high purity nitrogen gas in the overhead of the high pressure column 32 is supplied to the overhead of the low pressure column 34 by way of a conduit 110 and an expansion valve 81. Impure liquid nitrogen is supplied to the upper portion of the low pressure column 34 from the high pressure column 32 at the position lower than the position where the high purity liquid nitrogen is taken off by way of a piping 109 and an expansion valve 82. The liquid air in the bottom of the high pressure column 32 is divided into two parts: one being supplied into the intermediate portion of the low pressure column 34 by way of conduits 105 and 106 and an expansion valve 83; and the other being supplied as refrigerant to a condenser 36 of the crude argon column 35 by way of a conduit 107 and an expansion valve 84, whereupon it is gasified through heat exchange and is supplied to the intermediate portion of the low pressure column 34 by way of a conduit 108. At the low pressure column 34, the high purity nitrogen supplied to the overhead, the impure liquid nitrogen, and the liquid air supplied to the intermediate portion flow downward in the packing material 40 as reflux liquid. The reflux liquid is heat-exchanged with the high purity nitrogen gas of the high pressure column 32 at the condenser 33 of the bottom for condensing nitrogen gas, and at the same time it is vaporized and flows upward in the low pressure column 34, which is contacted with the liquid in the packing material 40, to be thus rectified. As a result, the high purity oxygen is obtained in the bottom of the column and the high purity nitrogen is obtained in the overhead of the column. An oxygen product and a nitrogen product are thus taken from conduits 114 and 115. Moreover, the nitrogen containing gas is taken from the upper portion of the low pressure column 34 as impure nitrogen by way of a conduit 113. The cold of the gas is recovered by a heat-exchanger, and is discharged to the atmospheric air.

On the other hand, the gas flowing upward through the lower portion of the low pressure column 34 passes through a conduit 111, and is supplied to the bottom of the crude argon column 35. The gas supplied to the crude argon column 35 flows upward in the column, whereupon it is heat-exchanged with liquid air as refrigerant at the condenser 36 at the overhead of the column for gasifying the liquid air and at the same time it is condensed and flows downward as reflux liquid, which is contacted with the gas in the packing material 40, to be thus rectified. As a result, high concentration argon is obtained in the overhead, which is taken off by way of a piping 116, which becomes a crude nitrogen product. The reflux liquid is returned into the intermediate portion of the low pressure column 34 by way of a conduit 112 of the crude argon column 35. In the above air separator, each of the upper column and the crude argon column is of the tray type.

In such a case, as disclosed in Japanese Laid-open Patent No. HEI 1-312382, the typical numbers of theoretical plates of the high pressure column, low pressure column and crude argon column are 50, 70, and 40, respectively. In the case of using the packing material in place of the trays, the height of the packing column is determined by the product of the HETP and the number of the theoretical plates. Moreover, as disclosed in Japanese Laid-open Patent No. HEI 4-227461, the HETP of the structured packing material having a specific surface area of 700 $m^2/m^3$ is in the range of from 188 mm to 203 mm, and it is well-known that to obtain the economical merit relative to the trays, the HETP of the packing material is required to be 178 mm or less. With respect to the packing material in this embodiment wherein the angle of the waveform passages shown in FIG. 8 is in the range of 45° to 50°, the HETP is about 160 mm. Accordingly, since the packing material described in this embodiment is smaller in HETP than the prior art packing material by 15% to 20%, the heights of the upper column and the crude argon column can be reduced by 15% to 20%, which is advantageous in terms of cost as compared with the trays.

While the pressure loss of the known structured packing material is 5–13 mmH$_2$O/theoretical plate, the pressure loss of the packing material in this embodiment is 3 mmH$_2$O/theoretical plate (F-factor=1) so that the pressure loss of each of the low pressure column and the crude argon column can be further reduced. It is known that the pressure of the high pressure column can be reduced to be about three times the reduction in the pressure of the low pressure column. This shows that the pressure ratio of the compressor of the air separator using atmospheric air as raw air can be reduced, that is, the power consumption can be lowered. Moreover, since the pressure loss of the crude argon column can be reduced, the number of the theoretical plates can be made larger in the case of the same pressure loss as conventional. Therefore, by increasing the number of the theoretical plates, there can be obtained another effect of improving the recovery ratio of argon.

According to this embodiment, the rectifier of the air separator can be reduced in size; there can be provided a packing material small in pressure loss; and an air separator with the reduced power can be provided. Moreover, the recovery ratio of argon can be improved.

The same effect can be obtained by provision of the packing material into the high pressure column 32 of this embodiment. This is effective to provide a smaller packing column.

According to the present invention, the transverse liquid distribution in a packing material can be improved, so that a gas-liquid contact interface can be increased. This is effective to provide a structured packing material with an excellent rectifying efficiency. Moreover, by provision of the packing material of the present invention into an air separator, the power consumption of the air separator can be reduced. Additionally, the pressure loss of a crude argon column can be reduced, so that the number of the theoretical plates can be increased. This is effective to provide an air separator which is excellent in the recovery ratio of argon.

We claim:

1. A packing material for providing mass transfer between gas and liquid, comprising:

thin corrugated plates each having a plurality of holes arranged in a square pattern; and a plurality of projections arranged in line, with corrugations of a pair of adjacent thin corrugated plates being oriented in different directions, wherein lines of said holes are arranged to be parallel to lines of said projections, with said lines of said projections being alternately repeated in a direction perpendicular to the direction of said lines of said holes and projections in the thin plate before said thin plate is corrugated.

2. A packing material according to claim 1, wherein, before said thin plate is corrugated, said projections form a plurality of rows spaced at predetermined intervals, and said holes are positioned to be intermediate between said rows of said projections.

3. A packing material according to claim 1, wherein said projections are disposed in parallel in the state that said thin plate is developed.

4. A packing material according to any of claims 1 to 3, wherein in the state that said thin plate is developed, a plurality of projections are provided, said projections including at least two types different in shape relative to the direction of the column axis.

5. A packing material according to claim 1, wherein the transverse extension of each of said projections provided on said thin plate relative to the column axis is larger than the longitudinal extension of each of said projections.

6. A packing material according to claim 1, wherein the transverse extension of each of said projections provided on said thin plate relative to the column axis is at least three times the longitudinal extension of each of said projections.

7. A packing material according to claim 1, wherein the whole projected area of said projections is at least 20% of the surface area of said thin plate which is in the developed state.

8. A packing material according to claim 1, wherein the height of each of said projections is in the range of from 0.2 mm to 0.5 mm.

9. A packing material according to claim 1, wherein the diameter of each of said holes is in the range of from 2.5 mm to 5.0 mm.

10. A packing material according to claim 1, wherein the transverse extension of each of said projections provided on said thin plate relative to the column axis is at least three times the longitudinal extension of each of said projections, the whole projected area of said projections is at least 20% of the surface area of said thin plate which is in the developed state, the height of each of said projections is in the range of from 0.2 mm to 0.5 mm, and the diameter of each of said holes is in the range of from 2.5 mm to 5.0 mm.

11. A packing material according to claim 10, wherein the specific surface area of said packing material is in the range of from 800 m$^2$/m$^3$ to 1100 m$^2$/m$^3$, and the tilting angle of said waveform passages tilted relative to the column axis is in the range of from 45° to 50°.

12. A packing material according to claim 1, wherein said thin plate is made of a work-hardened aluminum alloy.

13. A packing material according to claim 1, wherein recesses are formed on the rear sides of said projections.

14. A packing column comprising a rectifier for separating at least one liquid component, said rectifier including at least one raw gas flow-in piping, an overhead take-off piping and a reflux piping for performing gas-liquid contact between upward flow of gas and downward flow of liquid, wherein said packing material according to claim 1 is provided in said rectifier.

15. An air separator comprising at least one column composed of said packing column according to claim 14.

16. An air separator including a dual rectifier of a high pressure column and a low pressure column, and an argon column for rectifying argon, wherein each of said low pressure column and said argon column is composed of said packing column according to claim 14.

17. An air separator including a dual rectifier of a high pressure column and a low pressure column, and an argon column for rectifying argon, wherein each of said high pressure column, said low pressure column and said argon column is composed of said packing column according to claim 14.

18. The packing material recited in claim 1, wherein said packing material provides mass transfer between gas and liquid during at least one of distillation and absorption.

19. A packing material for separating gas and liquid, comprising:

a plurality of thin corrugated plates in a stack arrangement, adjacent ones of said plates being arranged so that passages formed by corrugations in said adjacent ones of said plates cross one another, each of said thin plates having formed thereon prior to being corrugated:

a plurality of holes arranged so as to form columns of holes in a first direction and rows of holes in a second direction, with said second direction being substantially perpendicular to said first direction, and columns of projections arranged on at least one surface in said first direction so that said columns of projections are disposed between said columns of holes, respectively, said columns of projections further being disposed relative to said rows of holes so that at least one projection is located substantially between each adjacent pair of holes in said rows of holes extending in said second direction.

20. A packing material for separating gas and liquid, comprising:

a plurality of thin corrugated plates in a stack arrangement, adjacent ones of said plates being arranged so that passages formed by corrugations in said adjacent ones of said plates cross one another, each of said thin plates having formed thereon prior to being corrugated:

a first plurality of rows formed of projections and holes alternating with one another, said first plurality of rows being arranged so as to be spaced from one another, and a second plurality of rows of projections disposed so that a row of projections is provided between adjacent ones of said plurality of rows of alternating rows and projections.

21. A method for manufacturing a packing material for separating gas and liquid, comprising:

forming holes in each of a plurality of thin plates, said plurality of holes being arranged so as to form a matrix pattern containing a plurality of columns of holes extending in a first direction and a plurality of rows of holes extending in a second direction, with said second direction being substantially perpendicular to said first direction;

forming columns of projections on at least one surface of each of said thin plates, said columns of projections being arranged so that said columns of projections are disposed between said columns of holes, respectively, said columns of projections further being disposed relative to said columns of holes so that at least one projection is located substantially between each adjacent pair of holes in said rows of holes extending in said second direction;

subjecting each of said thin plates to a corrugation process, said corrugation process forming passages in each of said thin plates; and arranging said corrugated thin plates in a stack in such a manner that passages in adjacent ones of said plates cross one another.

22. An air separator comprising at least one column composed of the packing material recited in claim 19.

23. An air separator comprising at least one column composed of the packing material recited in claim 20.

24. A method for making an air separator, said method comprising the step of fabricating a packing material in accordance with the method recited in claim 21.

25. The packing material recited in claim 20, wherein the projections in said first plurality of rows and the projections in said second plurality of rows are aligned so as to form a plurality of columns of projections.

* * * * *